April 5, 1949.  S. H. MAGID  2,466,643
APPARATUS FOR HEAT SEALING THERMOPLASTIC
STRIPS ABOUT ELASTIC ELEMENTS
Filed Nov. 16, 1946  2 Sheets-Sheet 1
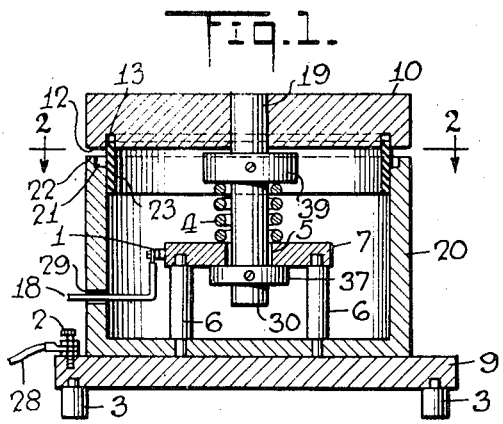
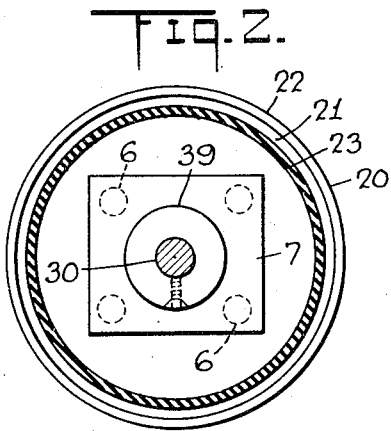
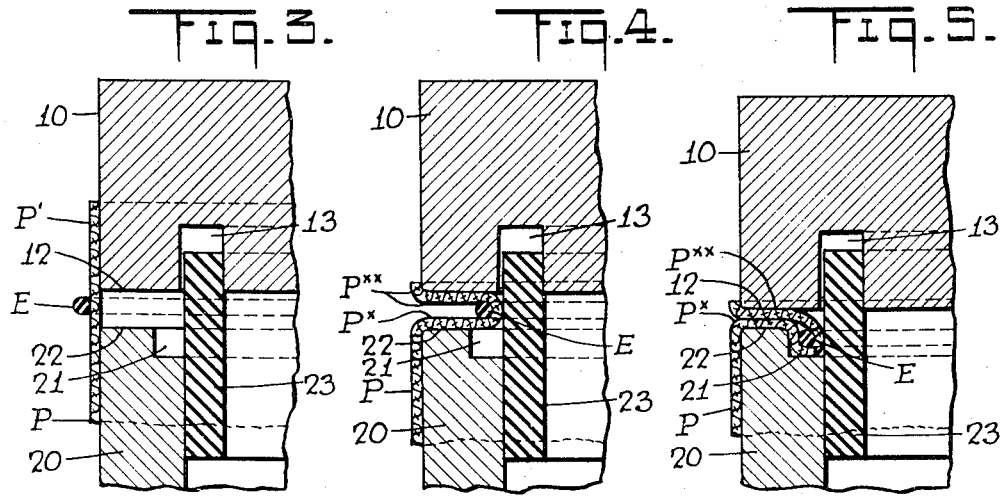
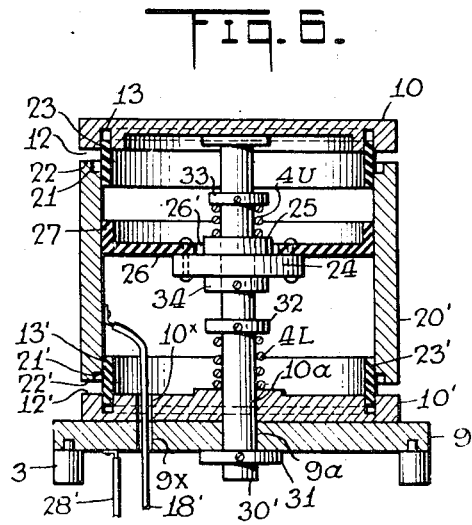
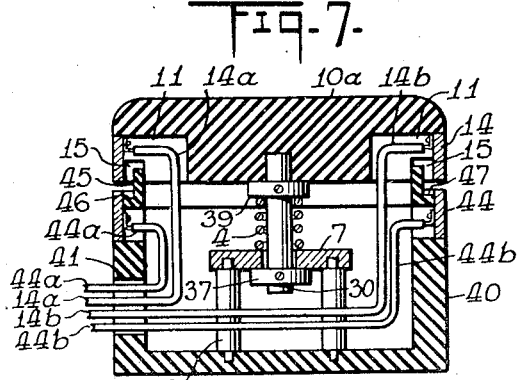
INVENTOR
Sidney H. Magid
BY William S. Huck
ATTORNEY April 5, 1949.  S. H. MAGID  2,466,643
APPARATUS FOR HEAT SEALING THERMOPLASTIC
STRIPS ABOUT ELASTIC ELEMENTS
Filed Nov. 16, 1946  2 Sheets-Sheet 2
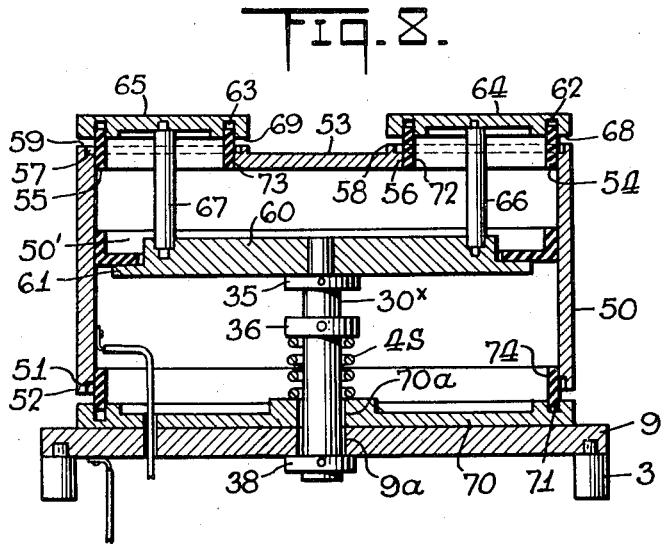
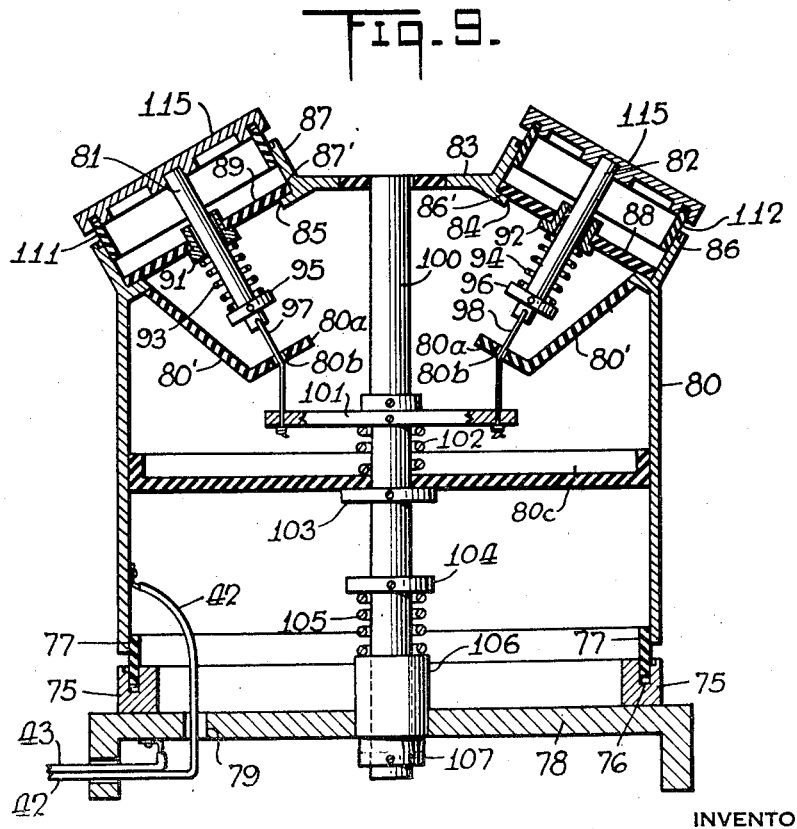
INVENTOR
Sidney H. Magid
BY
ATTORNEY Patented Apr. 5, 1949

2,466,643

UNITED STATES PATENT OFFICE 2,466,643

APPARATUS FOR HEAT SEALING THERMOPLASTIC STRIPS ABOUT ELASTIC ELEMENTS

Sidney H. Magid, Larchmont, N. Y.

Application November 16, 1946, Serial No. 710,315

17 Claims. (Cl. 154—1)

This invention relates to an apparatus for applying or affixing elastic elements to articles fabricated of plastic sheet material, such as Polythene, Pliofilm, Vinylite, etc., having an elastic element at one end thereof (e. g., bowl covers) or at both ends (e. g., lamp shade covers) or at three or more points thereof (e. g., baby pants which have three elastic elements, two at the leg openings and one at the waist).

The principal object of the invention is an apparatus for applying and sealing the elastic element or elements in the plastic sheet article at the proper place or places and to do so automatically, rapidly and cheaply.

For the attainment of this and such other objects as may appear or be pointed out, I have shown several embodiments of my invention in the accompanying drawings, wherein:

Fig. 1 is an elevational section of the apparatus for applying the elastic element to an open end of a tubular article, such as a bowl cover;

Fig. 2 is a transverse section taken on the line 2—2 of Fig. 1;

Figs. 3, 4 and 5 are enlarged fragmentary views explaining the operation; Fig. 3 showing a portion of the plastic sheet article in position together with the elastic element before the latter is released; Fig. 4 shows the parts after the elastic element has been released; and Fig. 5 shows the parts after the machine has operated to effect the sealing of the elastic element;

Fig. 6 is an elevational section of the apparatus for simultaneously applying two elastic elements to the plastic sheet article, e. g. at both ends of a lamp shade covering;

Fig. 7 is an elevational section of the single-elastic apparatus modified for a different type of electrical heating;

Fig. 8 is an elevational section of the apparatus for simultaneously applying three elastic elements to the plastic sheet article, e. g., a pair of baby pants (of the type having parallel legs); and Fig. 9 is an elevational section of a triple-elastic apparatus similar to that of Fig. 8 for the type of baby pants in which the legs are spread angularly outwardly.

Referring first to Fig. 1, the apparatus comprises two main parts, viz., a circular plate or head 10 and a cylindrical, hollow body member 20 which rests on, and is secured to, a base 9. For facility in illustration, head plate 10 and body member 20 are shown as circular and cylindrical, but it will be apparent that these may have any desired sectional or transverse outline.

Head plate 10 is mounted for a limited extent of elevational movement relative to body member 20. For this purpose there is provided within the body member and preferably centrally located, a mounting plate 7 which is supported from the floor of body member 20 by posts 6 of suitable electrical-insulating material. Mounting plate 7 has a central opening 5 which serves as a bearing for a vertical spindle 30, the upper end of which is received in a central opening 19 of head plate 10. Spindle 30 has a collar 37 which underlies mounting plate 7 and a collar 39 which underlies head plate 10. Interposed between the collar 39 and the mounting plate 7 is a compression coil spring 4. The parts are so designed, and collars 37, 39 so positionally secured to the spindle (as by the set screws shown) that normally spring 4 maintains head plate 10 in its elevated position, as shown, in which position there is a predetermined, relatively short distance between the underside of the head plate and the annular, upper edge of the body member.

The upper edge of the body member has an inwardly-disposed annular recess 21 which results in an outwardly-disposed annular lip 22, see also detail Fig. 3. Secured to the interior surface of body member 20 and disposed at its upper end to project upwardly therefrom is a narrow tube or ring 23 of suitable electrical-insulating material. The underside of head plate 10 has an annular groove 13 which is disposed and dimensioned to receive the said upwardly projecting portion of insulating tube or ring 23. The outwardly-disposed, annular surface of the head plate is designated 12.

The parts are shown in detail in Fig. 3 in the normal upward position of head plate 10. The first step is to place the plastic sheet article, which is assumed to be tubular (designated P), in position about the apparatus so that a predetermined portion thereof, P', extends above the space between head plate 10 and body member 20. Elastic element E is placed about the tubular article P at the said space, Fig. 3, in tensioned condition and then released, whereat it enters the space between head plate 10 and body member 20, Fig. 4, crimping or folding the plastic sheet inwardly to present opposing portions $P^x$ and $P^{xx}$; inward contraction of the elastic element is blocked by abutment with the insulating tube or ring 23, as clearly shown in Fig. 4. Head plate 10 is next moved downwardly, as shown in Fig. 5, (the upper portion of insulating tube 23 entering annular groove 13 of the head) to clamp portions $P^x$, $P^{xx}$ between its annular portion 12 and annular lip 22 of the body member 20, the elastic element E and the bight of the looped portions P$^x$, P$^{xx}$ being received in annular recess 21 of the body member.

While compressed together, Fig. 5, portions P$^x$ and P$^{xx}$ are fused or adhered together by local application of heat. I have found electrical heating to be well suited; the particular type of heating known as di-electric heating is shown in Figs. 1, 3-5, and also Fig. 6 (a second type of electrical heating will be described subsequently with reference to Fig. 7). Referring to Fig. 1, base 9, which is metal and conductive, rests on insulating feet 3 and is provided with a binding post 2 for electrical wire 28. Body member 20 has an opening 29 for a second electrical wire 18 which connects to a binding post 1 on mounting plate 7. Wires 18, 28 are connected to a high-frequency generator (not shown) to supply high-frequency potential to head plate 10 and body member 20, i. e., across the space separating the two, see Fig. 1 and Fig. 5. The current path at wire 28 is: 28, base 9, and body member 20. It will be observed that insulating posts 6 and feet 3 confine the electric flow to this path. The current path at wire 18 is: 18, mounting plate 7, spindle 30, and head plate 10. It will thus be seen that the insulation posts 6 prevent short-circuiting between the said two circuits. The circuit to the high-frequency generator is completed by a switch (not shown) when the head plate 10 is brought down to bear on the article portions P$^x$, P$^{xx}$ interposed between it and the body member 20, whereas heat of high intensity is generated by di-electric action across the annular lip 22 of the body member and annular surface 12 of the head plate, causing fusion of plastic material P$^x$, P$^{xx}$ and an effective sealing in position of elastic element E.

The apparatus, Fig. 6, for simultaneous sealing of two elastic elements has a head plate 10 which is similar to the one described above with reference to the single-elastic apparatus of Figs. 1 to 5; the body member 20' differs in that it is tubular and has no floor as in Fig. 1. The upper end of tubular body member 20' is similar to that described in Figs. 1 to 5 and accordingly these parts thereof bear the same reference characters. The lower end of the body member has similar annular lip 22' and annular recess 21'. Underlying its lower end is a bottom plate 10' which is similar to head plate 10 in that it has a similar annular groove 13' and annular surface 12'. An insulating ring or tube 23' is secured to the lower end of body member 20. Bottom plate 10' rests on a base 9 similar to that of Fig. 1 except that it is provided with a central opening and bearing 9a for vertical spindle 30'; bottom plate 10' itself has a central bearing opening 10a for the spindle.

Spindle 30' has a collar 31 underlying base 9 and a collar 32 spaced above the bottom plate 10'. Interposed between collar 32 and bottom plate 10' is a helical compressive spring 4L. The spindle has a third collar 34 in underlying relation to a carrier member 24 slidable on the spindle; carrier member 24 underlies a plate 26 of insulating material, having a flange 27 at its outer edge which is secured to body member 20'. Plate 26 has a central opening 26' in which is reserved a hub portion 25 of carrier member 24. Plate 26 is secured to carrier member 24. A fourth collar 33 is secured to the spindle; interposed between collar 33 and the hub portion 25 is a compression helical spring 4U.

The tubular plastic fabric (not shown) is placed about the apparatus with one end, at which one of the elastic elements is to be sealed, at the upper end (lip 22 of the body member and head plate 10) of the body member and with its other end, at which the other elastic element is to be sealed at the lower end (lip 22' of the body member and bottom plate 10'). The elastic elements (not shown) are placed at the upper space (head plate 10) and at the lower space (bottom plate 10'), the parts being positioned similarly to their positioning on the single-elastic apparatus of Figs. 1 to 5. A force is applied to the head plate 10; the resulting operation of the apparatus will depend upon the relative strength of the two compression springs 4U and 4L. Assuming that the lower spring 4L is weaker than upper spring 4U, the force applied to head plate 10 will lower it and spindle 30', all its collars including upper collar 33 and, through the stronger compression spring 4U, the carrier member 24, plate 26 secured thereto, and body member 20'. Consequently, the lower annular lip 22' of the body member approaches the annular surface 12' of the bottom plate 10', lower spring 4L being contracted, and presses together the two folds of the material (not shown in Fig. 6, but see detail Fig. 5). Further downward pressure on head plate 10 will now overcome the resistance of upper spring 4U and cause head plate 10 to approach the upper annular edge of body member 20', pressing together the folds of the material at the upper end of the apparatus.

After the lower edge of the body member has been forced towards the bottom plate 10' and the head plate 10 has been forced towards the upper edge of the body member, the control switch is closed to cause the folds of the plastic material at the upper end of the apparatus and at the lower end, to be fused together by electrical, dielectric heat, in the manner described with reference to the single-elastic apparatus of Figs. 1-5. One wire 28' from the high-frequency generator is connected to base 9 and conducts current to the bottom plate 10', which rests directly on the base, and to the head plate 10 view the spindle 30'. This potential is not conducted to the body member 20' because of the presence of insulating plate 26. The other wire 18' from the high-frequency generator is connected directly to body member 20'; wire 18' passes through an opening 9$^x$ in base 9 and an aligned opening 10$^x$ in bottom plate 10'.

Instead of di-electric heating, as in Figs. 1-5 (single elastic) and in Fig. 6 (double elastic), conductive heating may be employed, as in Fig. 7 which shows a single elastic apparatus similar to Fig. 1. In this case, head plate 10a has an annular band 14 of electrical conducting metal which serves as an electrical heating coil, the electrical current being conducted thereto at two diametrically opposed points. One of the electrical wires is designated 14a, and the other, 14b. Two diametrically opposite recesses 11, 11 are provided in head plate 10a to accommodate the connecting ends of wires 14a, 14b. Annular band 44 secured at the upper edge of body member 40 constitutes a second, independent heating coil, the electrical current being conducted to two diametrical opposite points thereof by wires 44a, 44b. A hole 41 is provided in the wall of body member 40 through which wires 14a, 14b, 44a, 44b pass into the interior of the body member. It is clear that wires 14a, 44a lead to one terminal of the current source, while wires 14b, 44b lead to the other terminal.

An insulating ring 45 having an outwardly turned flange 46 is secured at the said flange to the body member 40 to provide an annular recess 41 and to project the upper portion of the insulating ring above the upper edge of the insulating ring 45. Head plate 10a has an annular groove 15 in its underside to receive the upper portion of insulating ring 45. The spindle 30, its two collars, mounting 7, etc. are similar to Fig. 1 and bear the same reference characters. The tubular plastic article and the elastic element are placed on the apparatus in the manner described above with reference to Figs. 1–5 and the head plate moved downwardly to compress the two folds of the plastic material, see Fig. 5; a switch in the electrical circuit (not shown) is closed to energize heating coil 14 of the head plate 10a and heating coil 44 of the body member 40, to raise their temperature by conductive heating. The conductive heating arrangement of Fig. 7 may be applied in similar fashion to the double-elastic apparatus of Fig. 6.

Bifurcated plastic sheet articles, such as baby pants, requiring three elastic elements—one at each leg and one at the waist—are accommodated on the apparatus shown in Fig. 8, for simultaneous sealing of the three elastic elements. Body member 50 is open at its lower edge, in which is provided an inwardly-disposed annular recess 51 and an annular lip 52. Underlying lower edge 51—52 of the body member is a bottom plate 70 which rests on base 9. The upper end of body member 50 is closed by a plate 53 which may be integral therewith. Two spaced circular openings 54, 55 are provided in top plate 53. Encircling opening 54 is an annular lip 58 and an inwardly-disposed annular shoulder 56; encircling opening 55 is an annular lip 59 and an inwardly-disposed annular shoulder 57. Overlying opening 54 is a circular disk 64 provided with an annular groove 62 and having an annular surface 68; overlying opening 55 is a circular disk 65 provided with an annular groove 63 and having an annular surface 69. Secured within circular opening 54 is an insulating ring 72, the upper portion of which is slidably received in annular groove 62 of disk 64; secured within circular opening 55 is an insulating ring 73, the upper portion of which is slidably received in annular groove 63 of disk 65. Disk 64 is mounted by a central post 66 to a supporting plate 60; disk 65 is mounted to the supporting plate 60 by a central post 67.

Supporting plate 60 is mounted at the upper end of a vertical spindle $30^\times$ which has a collar 35 in underlying relation to plate 60. Spindle $30^\times$ is slidably disposed in central bearing openings 9a, 70a in the base 9 and bottom plate 70, respectively; a collar 38 is secured to the spindle in underlying relation to base 9. A third collar 36 is secured to the spindle and a compression coil spring 4S interposed between it and the bottom plate 70. Body member 50 is mounted on plate 60 by means of an annular flanged ring 50' which is secured at its neutral flange to the body member and which rests on the plate 60, or rather, on an annular ledge 61 thereof. In the previous figures, the insulating rings (such as 23 in Fig. 1 and Fig. 6, and 23' in Fig. 6) were described and shown as being secured to the body member. The insulating rings 73, 72 of Fig. 8 are secured in this manner. The insulating rings may be secured to the end plates, either the head plate or the bottom plate; this alternative construction is shown in Fig. 9 where the insulating ring 74 is secured to the bottom plate 70, more particularly, in an annular groove 71 thereof.

The bifurcated article, such as a pair of baby pants, is placed on the apparatus with the waist portion thereof disposed at the space between the lower end of body member 50 and bottom plate 70 and with one leg opening at the space between disk 65 and opening 55 of the body member and with the other leg opening at the space between disk 64 and the opening 54. A large elastic element is placed at the waist portion and two smaller elements at each of the leg openings, and released to form inwardly-turned folds (cf. Fig. 4). The two disks 64, 65 are then forced downwardly, moving supporting plate 60 (to which they are connected by posts 66, 67) in that direction together with spindle $30^\times$. This compresses the folded plastic material at the two legs. Further pressure on the disks causes the lower edge of body member 50 to compress the folded plastic material between it and bottom plate 70, i. e., at the waist of the garment. The electrical connection in Fig. 8 may be either that of Figs. 1 and 6 (di-electric heating) or that of Fig. 7 (conductive heating). It is shown as in Figs. 1 and 6.

The apparatus of Fig. 9 is also designed for bifurcated garments, such as baby pants, but differs from that of Fig. 8 in that the apparatus of Fig. 8 is for baby pants having legs or leg openings extending straight and parallel from the body portion, while the machine of Fig. 9 is for bifurcated garments in which the leg openings or legs extend outwardly at an angle. Body member 80 is open at its lower edge which is opposite an annular bottom ring 75 having an annular groove 76 in which is slidingly received an insulating ring 77; bottom ring 75 rests on base 78. The upper end of body member 80 is closed at 83 and has two circular openings 84, 85 disposed at an angle to the central axis of the body member. Encircling opening 84 is a flange of a length depending upon the length of the leg of the garment, and spaced outwardly from the opening to provide an annular ledge 86'. Seated on ledge 86' is an insulating disk 88. Overlying flange 86 is a circular disk 114 to which is secured insulating ring or tube 112. A bearing bushing 92 is centrally secured in insulating disks 88 and slidably supports a spindle 82 to which is secured a collar 96 near its lower end; the upper end of spindle 82 is secured to circular disk 115. Interposed between bearing bushing 92 and collar 96 is a tensile spring 94 secured at its ends to the bushing 92 and collar 96, respectively. The other opening 85 of the body member 80 has a similar flange 87, annular ledge 87', insulating disk 89, circular disk 115, insulating tube or ring 111, bearing bushing 91, spindle 81, tensile spring 93, and collar 95. The body member 80 is provided with two bracket arms 80' of suitable insulating material which present distal platforms 80a, 80a in underlying and spaced relation to the respective openings 85, 84.

A main spindle 100 is centrally disposed within body member 80 and has a collar 101. A flexible wire 97 is connected at one end to the lower end of leg spindle 81 and connected at the other end to a distal point of collar 101; a similar flexible wire 98 is connected between leg spindle 82 and the collar 101. Flexible wires 97, 98 pass through apertures 80b, 80b in the bracket platforms 80a.

Secured to body member 80 is a flanged plate 80c of suitable insulating material provided with a central opening for main spindle 100. Underlying insulated plate 80c is a spindle collar 103. Interposed between collar 101 and insulated plate 88c is a compression spring 102. Spindle 100 has a third collar 104, interposed between which and a bearing 106 secured to base 78 is a second compression spring 105. A fourth collar 107 underlies base 78. Base 78 has an opening 79 for an electrical wire 42 which is connected to body member 80; the other wire 43 is connected to base 78. Heating is by the inductive method (Figs. 1–6). The connection 43 to the base 78 supplies current to bottom ring 75 and via the main spindle 100 and flexible wires 97, 98, to the circular disks 115, 114, of the two leg openings 85, 84, respectively. The other connection 42 supplies current directly to the lower edge of the body member and to its two upper annular flanges 87, 86 at the leg openings.

After the garment is placed on the apparatus together with the three elastic elements, main spindle 100 is forced downwardly, first overcoming, say, compression spring 102. The downward movement of its collar 101 pulls the two flexible wires 97, 98 to draw spindles 81, 82 downwardly to cause the circular disks 115, 114 to approach the upper edge of annular leg flanges 87, 86. Further downward movement of spindle 100, this time overcoming the other compression spring 105, causes a lowering of body member 80 to approach the floor ring 75.

The elastic element E, see Figs. 3, 4 and 5, may be continuous, i. e., the encircling element E may be elastic at all points of its circumference; in this case, the annular electrodes (annular lip 22 and including recess 21, of the body member 20 and the annular surface 12 of the head plate) would likewise be continuous. In certain cases the elastic element need not be sealed all around its encircling circumference, or may be discontinuous; in this case the electrodes would be made discontinuous in conformity with the requirements of the elastic element and its sealing in the plastic article.

I claim:

1. Apparatus for affixing an elastic element to a flexible plastic sheet article at a predetermined point thereof, comprising a tubular body member having at one edge thereof an inwardly-disposed annular recess and an outer annular lip, a ring secured to the inside surface of the tubular body member a portion thereof extending beyond said edge, an end plate having an annular groove for slidably receiving the said extended portion of the ring and an outer annular surface confronting the said annular lip of the body member, said end plate and body member being normally separated to provide a space therebetween, said article being positionable on the apparatus with its said predetermined point at the said space and with said elastic element in tensioned condition encircling the article at said space whereby contraction of the tensioned elastic element crimps the article inwardly to form a fold of the plastic sheet in the said space with the contracted element in the bight thereof and encircling the said ring, said end plate being mounted for axial movement towards the body member to reduce the said space therebetween and to compress the plies of said fold between its said annular surface and the said annular lip of the body member, the said elastic element and bight of the fold being received in the said annular recess of the body member.

2. Apparatus for affixing an elastic element to a flexible plastic sheet article at a predetermined point thereof, comprising a tubular body member, an end member disposed opposite one edge thereof, one of the said members having an inwardly-disposed annular recess and an outer annular lip, and the other member having an annular surface opposite the said annular recess and lip of the other member, a ring disposed inwardly of and adjacent to said annular recess and annular surface of the two members, said members being normally separated to provide a space therebetween, said article being positionable on the apparatus with its said predetermined point at the said space and with said elastic element in tensioned condition encircling the article at said space whereby contraction of the tensioned elastic element crimps the article inwardly to form a fold of the plastic sheet in the said space with the contracted elastic element in the bight thereof and encircling the said ring, said members being mounted for relative axial movement to reduce said space and to compress the plies of said fold between said annular lip and annular surface, the said elastic element and bight of the fold being received in the said annular recess.

3. Apparatus for affixing an elastic element to a flexible plastic sheet article at a predetermined point thereof, comprising a tubular body member, an end member disposed opposite one edge thereof, one of the said members having an inwardly-disposed annular recess and an outer annular lip, and the other member having an annular surface opposite the said annular recess and lip of the other member, a ring disposed inwardly of and adjacent to said annular recess and annular surface of the two members, said members being normally separated to provide a space therebetween, said article being positionable on the apparatus with its said predetermined point at the said space and with said elastic element in tensioned condition encircling the article at said space whereby contraction of the tensioned elastic element crimps the article inwardly to form a fold of the plastic sheet in the said space with the contracted elastic element in the bight thereof and encircling the said ring, said members being mounted for relative axial movement to reduce said space and to compress the plies of said fold between said annular lip and annular surface, the said elastic element and bight of the fold being received in the said annular recess, and means for heating the said annular lip and annular surface to cause adhesion of the said plies of said fold of the plastic article.

4. Apparatus for affixing an elastic element to a flexible plastic sheet article at a predetermined point thereof, comprising a tubular body member, an end member disposed opposite one edge thereof, one of the said members having an inwardly-disposed annular recess and an outer annular lip, and the other member having an annular surface opposite the said annular recess and lip of the other member, a ring disposed inwardly of and adjacent to said annular recess and annular surface of the two members, said members being normally separated to provide a space therebetween, said article being positionable on the apparatus with its said predetermined point at the said space and with said elastic element in tensioned condition encircling the article at said space whereby contraction of the tensioned elastic element crimps the article inwardly to form a fold of the plastic sheet in the said space with the contracted elastic element in the bight thereof and encircling the said ring, said members being mounted for relative axial movement to reduce said space and to compress the plies of said fold between said annular lip and annular surface, the said elastic element and bight of the fold being received in the said annular recess, and a high-frequency electrical circuit one terminal of which is connected to one of said pair of members and the other terminal is connected to the other member, so that when an electrical potential is impressed across the said space adhesion of the said plies of said fold of the plastic article occurs.

5. Apparatus for affixing an elastic element to a flexible plastic sheet article at a predetermined point thereof, comprising a tubular body member having an annular band secured at one edge, an end plate member having an annular band secured to the underside thereof and aligned with the said band of the body member, said members being normally separated to provide a space between their respective bands, a ring secured to one of said members and disposed inwardly of its band to provide an annular recess, said article being positionable on the apparatus with its said predetermined point at the said space and with said elastic element in tensioned condition encircling the article at said space whereby contraction of the tensioned elastic element crimps the article inwardly to form a fold of the plastic sheet in the said space with the contracted elastic element in the bight thereof and encircling the said ring, members being mounted for relative axial movement to reduce the said space therebetween and to compress the plies of said fold between their bands, the said elastic element and bight of the fold being received in the said annular recess.

6. Apparatus for affixing an elastic element to a plastic sheet article at a predetermined point thereof, comprising a tubular body member, an end member disposed opposite one edge thereof, said members having opposed annular surfaces and being normally separated to provide a space therebetween, a ring member disposed inwardly of the said annular surfaces, the members presenting an annular recess at the outer surface of the ring member, said article being positionable on the apparatus with its said predetermined point at the said space and with said elastic element in tensioned condition encircling the article at said space whereby contraction of the tensioned elastic element crimps the article inwardly to form a fold of the plastic sheet in the said space with the contracted elastic element in the bight thereof and encircling the said ring member, said members being mounted for relative axial movement to reduce said space and to compress the said fold between said annular surfaces, the said elastic element and bight of the fold being received in the said annular recess.

7. Apparatus for affixing an elastic element to a plastic sheet article at a predetermined point thereof, comprising a tubular body member, an end member disposed opposite one edge thereof, said members having opposed annular surfaces and being normally separated to provide a space therebetween, a ring member disposed inwardly of the said annular surfaces, the members presenting an annular recess at the outer surface of the ring member, said article being positionable on the apparatus with its said predetermined point at the said space and with said elastic element in tensioned condition encircling the article at said space whereby contraction of the tensioned elastic element crimps the article inwardly to form a fold of the plastic sheet in the said space with the contracted elastic element in the bight thereof and encircling the said ring member, said members being mounted for relative axial movement to reduce said space and to compress the said fold between said annular surfaces, the said elastic element and bight of the fold being received in the said annular recess and means for heating the said annular surfaces to cause adhesion of the said fold of the plastic article.

8. Apparatus for affixing elastic elements to a flexible plastic sheet article at a plurality of predetermined thereof, comprising a tubular body member, an end member disposed opposite each edge thereof, said members having opposed annular surfaces at each said edge and normally separated to provide a space thereat, a ring member at each said edge disposed inwardly of the said annular surfaces, the members presenting an annular recess at each said edge, said article being positionable on the apparatus with one of its said predetermined points at each of said spaces and with an elastic element in tensioned condition encircling the article at said spaces whereby contraction of the tensioned elastic elements crimps the article inwardly to form a fold of the plastic sheet in each of said spaces with the contracted elastic elements in the bight thereof and encircling the respective ring members, said members being axially movable to reduce the said spaces and to compress the said folds between the annular surfaces, the said elastic elements and bights of the folds being received in the said annular recesses.

9. Apparatus for affixing elastic elements to a flexible plastic sheet article at a plurality of predetermined points thereof, comprising a tubular body member, an end member disposed opposite each edge thereof, said members having opposed annular surfaces at each said edge and normally separated to provide a space thereat, a ring member at each said edge disposed inwardly of the said annular surfaces, the members presenting an annular recess at each said edge, said article being positionable on the apparatus with one of its said predetermined points at each of said spaces and with an elastic element in tensioned condition encircling the article at said spaces whereby contraction of the tensioned elastic elements crimps the article inwardly to form a fold of the plastic sheet in each of said spaces with the contracted elastic elements in the bight thereof and encircling the respective ring members, said members being axially movable to reduce the said spaces and to compress the said folds between the annular surfaces, the said elastic elements and bights of the folds being received in the said annular recesses, and means for heating the said annular surfaces to cause adhesion of the said folds of the plastic article.

10. The combination according to claim 8 wherein one of the end members is a secured base member and the other end member is mounted for axial movement relative to the body member and the body member is mounted for axial movement relative to the base member.

11. An apparatus to form a hem around a continuous portion of a sheet of material, with an elastic band confined within the hem in the bight thereof said apparatus comprising two relatively, co-axially movable, normally spaced apart, hollow dies, a gage block within said die and having a peripheral conformation substantially parallel to the inner perimeter of at least one of the dies, said gage block being spaced apart from said inner perimeter whereby when the dies are brought together for uniting the plies of the hem, the bight of the hem will be free of the die.

12. An apparatus to form a hem around a continuous portion of sheet material with a tunnel adjacent the bight of the hem enclosing an elastic band said apparatus comprising relatively movable coacting dies, one of the dies being provided with a groove to accommodate the bight of the hem, when the elastic band is placed over the sheet material overlying said groove whereby to tuck the sheet material into said groove, means to fold over the material to form all portions of the hem substantially simultaneously, and means simultaneously to unite the entire hem around said die.

13. In an apparatus for forming a hem around a continuous portion of a sheet of material with an elastic element confined within the hem adjacent the bight thereof; a die assembly having two relatively co-axially movable normally spaced apart portions which have coacting faces remote from the common axis of said portions, a gage radially inward of the coacting faces constructed and arranged to extend past the space between said faces and to be sufficiently spaced apart from the interface region or zone formed by the coacting faces, to accommodate the elastic element and the bight of the hem when said faces are brought toward each other.

14. The die assembly as claimed in claim 13 further characterized by said portions being electrically insulated from each other to permit dielectric heat to be applied and thereby uniting the plies of the hem formed between the dies.

15. An apparatus as called for in claim 13, further characterized by the provision of power means to cause a meeting of adjacent surfaces to apply pressure to the confined hem to unite the plies thereof.

16. An apparatus as called for in claim 13 further characterized by the provision of heating means in die assembly so that movement of said die portions toward each other causes meeting of adjacent surfaces thereby to apply heat to the confined hem to unite the plies thereof.

17. An apparatus to form a hem around a continuous portion of sheet material with a tunnel adjacent the bight of the hem enclosing an elastic band, said apparatus comprising relatively movable coacting dies, one of the dies being provided with a groove to accommodate the bight of the hem when the elastic band is placed over the sheet material overlying said grooves whereby to tuck the sheet material into said groove, and means simultaneously to unite the entire hem around said die, said portions being electrically insulated from each other to permit dielectric heat to be applied and thereby uniting the plies of the hem formed between the dies.

SIDNEY H. MAGID.

REFERENCES CITED

The following references are of record in the file of this patent:

UNITED STATES PATENTS

| Number | Name | Date |
| --- | --- | --- |
| 1,755,926 | Leguillon et al. | Apr. 22, 1930 |
| 2,231,457 | Stephen | Feb. 11, 1941 |
| 2,259,508 | Abramson | Oct. 21, 1941 |
| 2,304,852 | Sharples | Dec. 15, 1942 |
| 2,412,693 | Pierson | Dec. 17, 1946 |